R. C. BOECKEL.
CANDY HOLDING TRAY.
APPLICATION FILED DEC. 16, 1911.
1,023,714.
Patented Apr. 16, 1912.
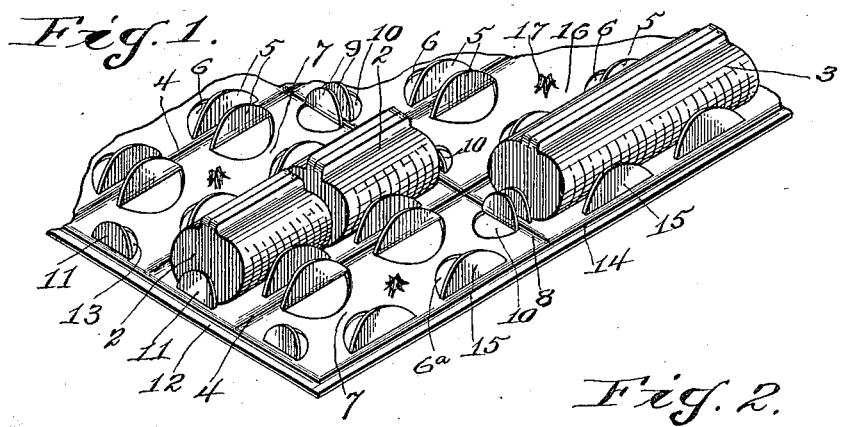
Witnesses
Wm. E. Valk Jr.
Edw. L. Frugel
Inventor
Robert C. Boeckel
By
C. J. Relf
Attorney

UNITED STATES PATENT OFFICE.

ROBERT C. BOECKEL, OF YORK, PENNSYLVANIA.

CANDY-HOLDING TRAY.

1,023,714.  Specification of Letters Patent.  Patented Apr. 16, 1912.

Application filed December 16, 1911. Serial No. 666,173.

*To all whom it may concern:*

Be it known that I, ROBERT C. BOECKEL, a citizen of the United States, residing at York, in the county of York and State of Pennsylvania, have invented certain new and useful Improvements in Candy-Holding Trays, of which the following is a specification.

This invention relates to candy holders, and particularly to a plate or tray of novel and peculiar design for holding pieces of candy, so as to avoid contact of the pieces, and the employment of individual wrappers therefor.

The object of the invention is to provide a tray or plate having such construction as to hold cylindrically-shaped pieces of candy of various lengths, so that the least possible contact is made between the candy and special cleats or ears which grip the candy for holding it on tray seats of special design.

A still further object of the invention is to provide, in a candy holding tray or plate, specially designed candy seats or rests separated by ribs or beaded portions of the plate or tray and having candy-engaging cleats or ears projecting in pairs from the ribs so as to form oblong receptacles for the candy.

Various other objects, advantages and improved results are attainable in the practical application of the invention.

In the accompanying drawings forming part of this application: Figure 1 is a perspective view of a portion of a tray or plate embodying the invention and showing the application thereof. Fig. 2 is an inverted plan view of the tray or plate. Fig. 3 is a central cross section of a long piece of candy and the portion of the tray which holds it. Fig 4 is a similar view of the short piece of candy and the holding portion of the tray. Fig. 5 is a detail section showing a nest of several trays.

The same reference characters denote the same parts throughout the several views of the drawings.

In carrying out the invention, sheets of such size and material, preferably tin, as may be found best adapted for the purpose are employed, and said sheets may be multiplied in duplication and arranged in nests with supports 1, intervening the sheets of the nest, as clearly shown in Fig. 5 of the drawings.

The invention consists in the construction or formation of the sheets for greater convenience and adaptability thereof in holding candy for packing, shipping, and dispensing, so that certain objections and disadvantages found in other holders of this character are obviated.

This holder is especially designed for holding oblong pieces of candy of cylindrical shape, as indicated by reference characters 2 and 3 in Figs. 1, 3 and 4 of the drawings, and while only two lengths of candy are shown, the same size sheets or trays may be made to hold various other lengths or blocks of candy as may be desired.

The sheet is made into a candy-holding tray by impressing or otherwise forming beads or ribs 4, in the sheet, and by partially cutting out a plurality of sections of the sheet in pairs adjacent to the ribs so as to form flexible ears or gripping cleats 5, the cleats being bendable toward each other in pairs on the ribs so that the ribs form the only connection between the cleats of each pair and thereby afford a rigid or stiffened portion from which the cleats are bent into upright position, or into such position, according to the diameter of the pieces of candy, for gripping the candy. In order to have the cleats make the least engagement with the candy sufficient to hold the candy from displacement, and in order that the candy may not be injured or defaced under the gripping engagement of the cleats, the tray sheet is cut with semicircular dies or cutters so as to form cleats of semicircular shape, and when the cleats are raised or bent from the sheet at the ribs, each cleat leaves a semicircular opening 6, and inasmuch as the cleats of each pair are bent toward each other, there is left a pair of openings 6 between each pair of cleats, and the openings of each pair are separated by a web 7, which forms a rest between two pairs of cleats for the candy. The webs 7 are of less width than the openings 6, and the openings occupy the greater part of the candy-seating space between each pair of cleats, so that the usual extensive contact between the candy and the seats is avoided.

It will be seen that the ribs prevent a deflection of the material between the cleats in bending the cleats into vertical position, and that the ribs form a rigid base upon which the cleats may be bent and adjusted as desired. The ribs, being adjacent to the openings 6, elevate the tray sufficiently to prevent softened candy, which may project through the openings, from contact with the candy of the next tray, or with a shelf, counter or the like, upon which a tray of candy may be placed.

The ribs 4 are crossed by similar beads or ribs 8, and these ribs have flexible semicircular cleats 9 arranged in pairs cut out of the tray-sheet and forming the ends of certain of the candy pockets, and leaving semicircular openings 10 in the candy-seat adjacent to the end cleats 9. The other or outer ends of the other pockets are formed by single semicircular cleats 11 cut out of the tray-sheet and projecting from the edge-ribs 12, so as to leave semicircular openings 13 adjacent to the end-cleats 11. Similar edge-ribs 14 have single semicircular cleats 15 projecting therefrom so as to leave semicircular openings $6^a$, and to form the outer side of the pockets, and these cleats are arranged lengthwise the ribs 14.

The webs 7 are connected together and with the ribs 4 for each candy seat, by plate or sheet sections 16, and the center of each of the sections 16 is punctured from the bottom side of the tray so as to form burs 17. The function of the burs is two-fold, in that they form an abutment for one end of the short or half length pieces of candy, and they prevent the long pieces of candy from turning the pockets by having such pieces pressed down upon them.

It is obvious that the tray, as shown and described, may be used for both short and long pieces of oblong or cylindrically-shaped candy; that the cleats may be bent so as to grasp similar pieces of candy of various thickness or diameter; and that such pieces may be placed in and removed from the pockets without injury or defacement, and in a most expeditious manner.

The device may be formed of any suitable material for the purpose, it being evident that the device may be shipped flat or in blank form, may be made any size, is positive in its operation, and can be quickly set up for use.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

A candy-holding tray having two sets of bracing ribs depressed from the holding face of the tray, the ribs of one set intersecting the ribs of the other set and forming oblong candy-holding sections, and curved cleats struck out of the sections and bendable on certain portions of the ribs of each set and projecting above said ribs for engaging the candy at the ends and the sides of the sections.

In witness whereof I hereunto set my hand in the presence of two witnesses.

ROBERT C. BOECKEL.

Witnesses:
WILLIAM H. KUHL, Jr.,
R. EARL BOECKEL.

Copies of this patent may be obtained for five cents each, by addressing the "Commissioner of Patents, Washington, D. C."